US012664878B2

(12) United States Patent
Koutsos

(10) Patent No.: US 12,664,878 B2
(45) Date of Patent: Jun. 23, 2026

(54) REMOTE MONITORING MODULE

(71) Applicant: REACTON FIRE SUPPRESSION LTD, Edinburgh (GB)

(72) Inventor: Theodoros Koutsos, Edinburgh (GB)

(73) Assignee: REACTON FIRE SUPPRESSION LTD, Edinburgh (GB)

( * ) Notice: Subject to any disclaimer, the term of this patent is extended or adjusted under 35 U.S.C. 154(b) by 153 days.

(21) Appl. No.: 18/553,255

(22) PCT Filed: Mar. 26, 2022

(86) PCT No.: PCT/IB2022/052785
§ 371 (c)(1),
(2) Date: Sep. 29, 2023

(87) PCT Pub. No.: WO2022/208270
PCT Pub. Date: Oct. 6, 2022

(65) Prior Publication Data
US 2024/0212483 A1     Jun. 27, 2024

(30) Foreign Application Priority Data

Mar. 29, 2021     (GB) ..................................... 2104447

(51) Int. Cl.
*G08C 17/02*          (2006.01)
*A62C 37/00*          (2006.01)
(Continued)

(52) U.S. Cl.
CPC .............. *G08C 17/02* (2013.01); *A62C 37/00* (2013.01); *G08B 17/00* (2013.01); *H04Q 9/00* (2013.01);
(Continued)

(58) Field of Classification Search
CPC ............... G08C 17/02; G08C 2201/31; G08C 2201/93; G08C 2201/30; G08B 17/00;
(Continued)

(56) References Cited

U.S. PATENT DOCUMENTS

| | | | |
|---|---|---|---|
| 10,778,274 B1 * | 9/2020 | Paraskevaidis | ...... H04B 1/3888 |
| 2014/0345885 A1 * | 11/2014 | Wagner | .............. A62C 99/0018 |
| | | | 169/61 |

(Continued)

FOREIGN PATENT DOCUMENTS

| | | | | |
|---|---|---|---|---|
| CN | 210409293 U | 4/2020 | | |
| EP | 3571911 A1 | 1/2020 | | |
| WO | WO-2020005520 A1 * | 1/2020 | ............. | A62C 35/68 |

OTHER PUBLICATIONS

United Kingdom Intellectual Property Office, "Search Report under Section 17," mailed Jan. 7, 2022, for U.K. Application No. GB2104447. 4, 1 page.

(Continued)

*Primary Examiner* — Adnan Aziz
(74) *Attorney, Agent, or Firm* — Van Hoven PC; Stefan D. Osterbur; Joshua Van Hoven

(57) ABSTRACT

Aspect and embodiments of the present invention relate to a remote monitoring module for monitoring of parameters of vehicles, plant and other facilities. An aspect of the invention provides control circuitry configured to activate one or more safety protocols, an activation button that is wirelessly connected to the control circuitry, wherein actuation of the activation button causes: i) transmission of an activation signal from the activation button to the control circuitry, and ii) the control circuitry to activate at least one of the one or more safety protocols upon receiving the activation signal. Another aspect of the invention provides junction box for a fire suppression system, the junction box comprising an enclosure having at least an input port for a fire detection (Continued)

system, an input for receiving a request to activate a fire suppression system and an exhaust, wherein an inert gas is delivered to the junction box via the input port for the fire detection system and a flow path between the input port for the fire detection system and the exhaust is provided, wherein the flow path is interrupted by a valve that is normally closed, and wherein upon receipt of a request to activate the fire suppression system, the valve is opened to permit the inert gas to pass through the valve and exit the enclosure by way of the exhaust.

16 Claims, 8 Drawing Sheets

(51) Int. Cl.
_G08B 17/00_ (2006.01)
_H04Q 9/00_ (2006.01)
(52) U.S. Cl.
CPC ..... _G08C 2201/31_ (2013.01); _G08C 2201/93_ (2013.01); _H04Q 2209/823_ (2013.01)

(58) Field of Classification Search
CPC ...... G08B 25/14; G08B 19/005; G08B 25/10; G08B 25/12; G08B 29/145; G08B 29/043; H04Q 9/00; H04Q 2209/823; H04Q 2209/40; A62C 37/00; A62C 3/002; A62C 37/44
See application file for complete search history.

(56) References Cited

U.S. PATENT DOCUMENTS

| | | | | |
|---|---|---|---|---|
| 2015/0231431 A1* | 8/2015 | Sandahl | ............... | A62C 35/023 |
| | | | | 700/283 |
| 2015/0348399 A1* | 12/2015 | Cree | ..................... | G06F 3/0488 |
| | | | | 715/740 |
| 2018/0286218 A1 | 10/2018 | Kitterman et al. | | |
| 2019/0371155 A1* | 12/2019 | Lakshmipathy | ....... | G08B 17/06 |
| 2021/0077844 A1* | 3/2021 | DeNunzio | ................. | G01S 5/14 |

OTHER PUBLICATIONS

European Patent Office, "International Search Report," mailed Aug. 23, 2022, for PCT Application No. PCT/IB2022/052785, 7 pages.

* cited by examiner

REMOTE MONITORING MODULE

This application is a national stage application under 35 U.S.C. § 371 of International Application No. PCT/IB2022/052785, filed Mar. 26, 2022, entitled "Remote Monitoring Module," which claims priority to United Kingdom Patent Application No. 2104447.4, filed Mar. 29, 2021, the contents of all of which are hereby incorporated herein in their entirety by reference for all purposes.

FIELD

Aspects and embodiments of the present invention relate to a remote monitoring module that may be used in connection with monitoring of parameters of vehicles, plant and other facilities.

BACKGROUND

Plant, machinery and enclosures housing high value electronics are often provided with fire suppression systems to directly apply a fire suppression medium to a point of ignition. Time is of the essence in the event of a fire if extensive and costly damage is to be avoided. Seeking to address this, prior art systems exist that use a heat sensitive tube which is designed to burst when it reaches a certain temperature. When the tube bursts, a fire suppression agent is dispersed directly from the point of burst onto the affected area of the electrical cabinet thus addressing the source of heat directly. While such systems are effective to directly target a point of ignition, it is necessary for a run of burst tube to be installed in the close vicinity of a fire ignition point. This is not always possible, particularly in the event of a fire suppression system installed in plant or machinery where space is limited and the operating environment may be unsuitable for installation of burst tube, or other frangible components.

To address the above, manual activation actuators may be employed to allow an operator to activate a fire suppression system upon becoming aware of a fire. Such actuators are generally integrated into a control module located in the cab of plant or in a fixed location at the controls for machinery. Of course, an operator will not always be situated within the cab of plant or at the controls of machinery and thus may not be able to operate the actuator to activate the fire suppression system in time to expedite activation and avoid unnecessary damage to the plant or machinery.

In addition, sensory determination of a fire event relies upon the visual, oral or olfactible judgement of the operator to determine existence of a fire. By the time such judgement is exercised, a fire may already have taken hold and resulted in extensive damage.

It is against this background that the present invention has arisen.

SUMMARY

An aspect of the invention provides a remote monitoring module comprising remote monitoring module comprising control circuitry configured to activate one or more safety protocols, and an activation button that is wirelessly connected to the control circuitry, wherein actuation of the activation button causes: i) transmission of an activation signal from the activation button to the control circuitry, and ii) the control circuitry to activate at least one of the one or more safety protocols upon receiving the activation signal.

This aspect of the invention provides a wireless activation button that can be removed from plant or machinery by an operator and kept on the person of the operator while performing tasks outside of the plant or machinery. For example, an operator driving a working machine such a skid-steer loader may leave the cab to speak to a colleague or manually move an object. While outside of the vehicle a fire may ignite in the engine compartment. The operator may observe smoke coming from the engine department and in the prior art would be required to move towards the fire to enter the cab and activate a fire suppression system. This aspect of the invention enables the operator to operate the activation button that is wirelessly connected to the control circuitry of the invention. Operation of the activation button results in an activation signal being transmitted from the activation button to the control circuitry in order to activate the fire suppression system for the plant or machinery. Enabling activation of the fire suppression system from a location away from the plant or machinery is advantageous in terms of reducing the time taken for an operator to activation the fire suppression system and from a safety perspective in that an operator should not be compelled to travel towards danger in the event of a fire.

In one embodiment the remote monitoring module further comprises an enclosure for housing the control circuitry, the enclosure defining a first attachment part and the activation button comprises a second attachment part configured to cooperate with the first attachment part, together the first attachment part and second attachment part cooperate to enable the activation button to be selectively attached to and removed from the enclosure. In one embodiment the enclosure comprises a backbox for housing the control circuitry and a fascia that mounts a display screen.

In one embodiment the remote monitoring module further comprises at least one input connection and at least one output connection. In one embodiment the at least one input connection comprises one or more of the following inputs: fire sensor, service sensor, pressure sensor, smoke detector, temperature sensor, engine monitor sensors or battery sensors.

In one embodiment the display screen is configured to display an image of a vehicle or structure within which the remote monitoring module is mounted. In one embodiment the display screen is a touch screen. In one embodiment the display screen is configured to display a graphic or indicator corresponding to each of the one or more inputs. In one embodiment the graphic or indicator corresponding to each of the one or more inputs, is selectable by a user to generate for display a menu representative of the one or more inputs associated with the graphic or indicator.

In one embodiment the control circuitry further comprises a first wireless connection with the activation button and a second wireless connection with a remote device. In one embodiment the control circuitry comprises a RF antenna and the activation button comprises a RF receiver.

In one embodiment the first attachment part comprises a first electrical connector and the second attachment part comprises a second electrical connector, the first and second electrical connectors cooperating to provide power from the control circuitry to the activation button when the activation button is attached to the enclosure.

In one embodiment the activation button further comprises vibration means operable in response to receiving a signal via the first wireless connection indicative of a sensor input exceeding a pre-determined threshold. In one embodiment the activation button further comprises at least one of a visual warning indicator or speaker. In one embodiment the vibration means and/or visual warning indicator and/or speaker is/are operable to deliver a different characteristic of warning indication depending on the type of sensor that is determined to have exceeded the pre-determined threshold and/or the amount by which the pre-determined threshold of a sensor input has been exceeded.

Another aspect of the invention provides a system for monitoring for occurrence of an emergency event, the system comprising: a remote monitoring module comprising remote monitoring module comprising control circuitry configured to activate one or more safety protocols, and an activation button that is wirelessly connected to the control circuitry, wherein actuation of the activation button causes: i) transmission of an activation signal from the activation button to the control circuitry, and ii) the control circuitry to activate at least one of the one or more safety protocols upon receiving the activation signal; at least one of a fire sensor, service sensor, pressure sensor, smoke detector, temperature sensor, engine monitor sensor or battery sensor operably connected to the respective inputs of the remote monitoring module; and fire suppression apparatus that is operable by way of one or more of the fire sensor, service sensor, pressure sensor, smoke detector, temperature sensor, engine monitor sensor or battery sensor outputting a value that is determined by the control circuitry to be representative of a value that exceeds a predetermined threshold and/or by way of actuation of the activation button.

Another aspect of the invention provides a junction box for a fire suppression system, the junction box comprising an enclosure having at least an input port for a fire detection system, an input for receiving a request to activate a fire suppression system and an exhaust, wherein an inert gas is delivered to the junction box via the input port for the fire detection system and a flow path between the input port for the fire detection system and the exhaust is provided, wherein the flow path is interrupted by a valve that is normally closed, and wherein upon receipt of a request to activate the fire suppression system, the valve is opened to permit the inert gas to pass through the valve and exit the enclosure by way of the exhaust.

In one embodiment the valve is a solenoid valve and further comprises at least one pressure switch to monitor the pressure of the inert gas maintained by the solenoid valve, wherein the pressure switch is operated upon determination that the pressure of the inert gas drops below a threshold.

DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

DESCRIPTION

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in the figures.

Figure 1:
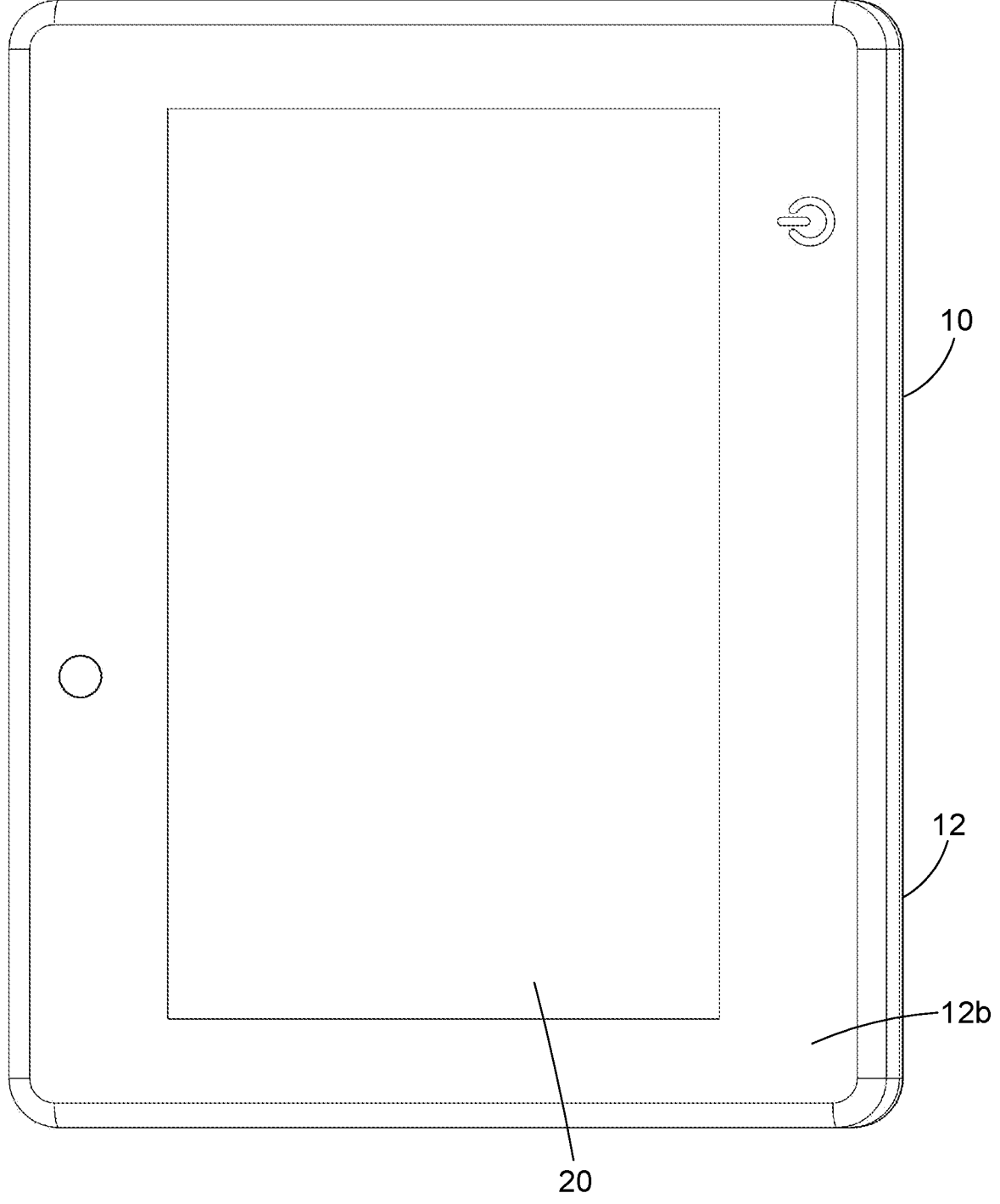
FIG. 1 shows a first view of a remote monitoring module according to the present invention.
Figure 2:
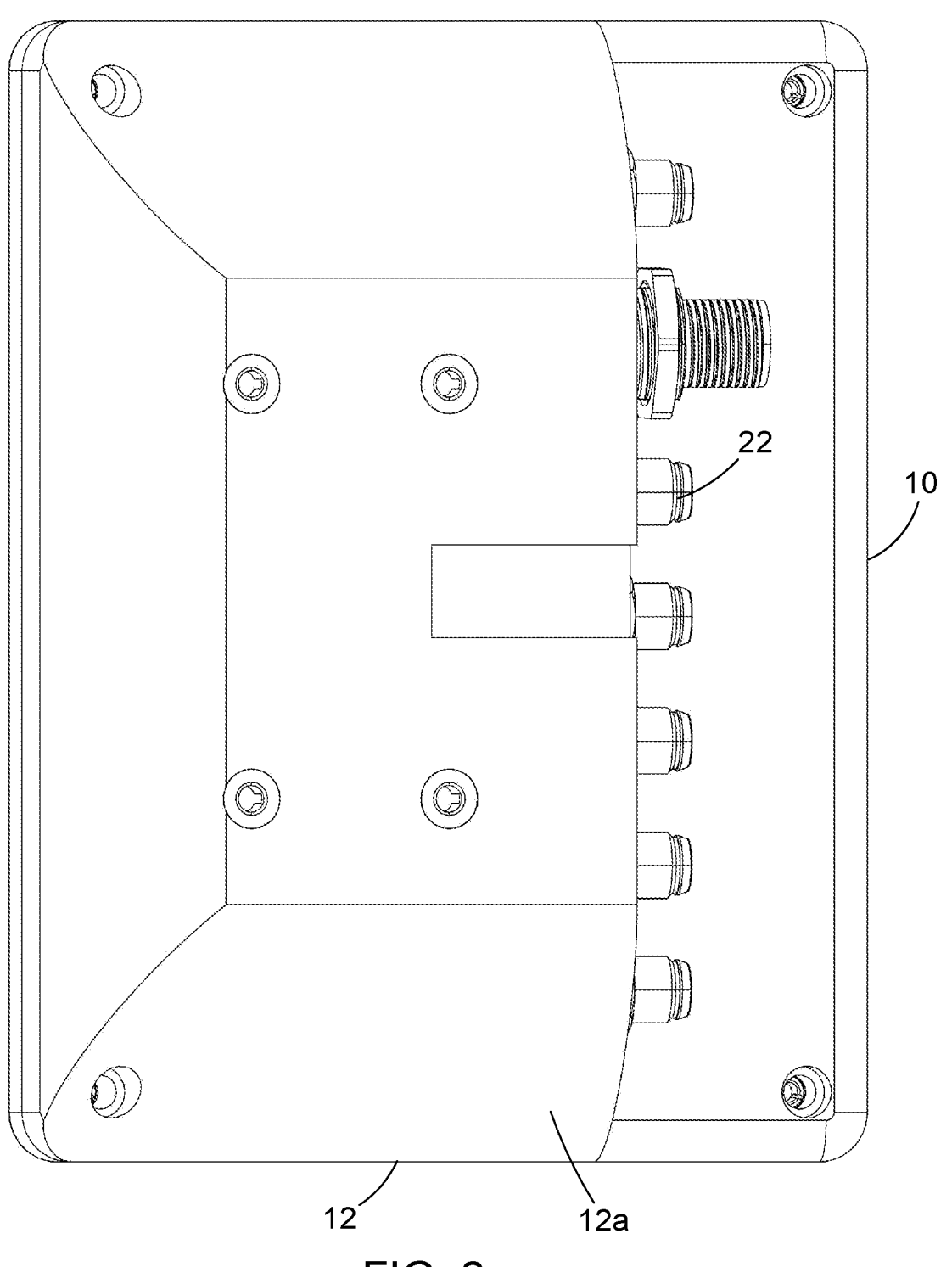
FIG. 2 shows a second view of the remote monitoring module of the present invention.
Figure 3:
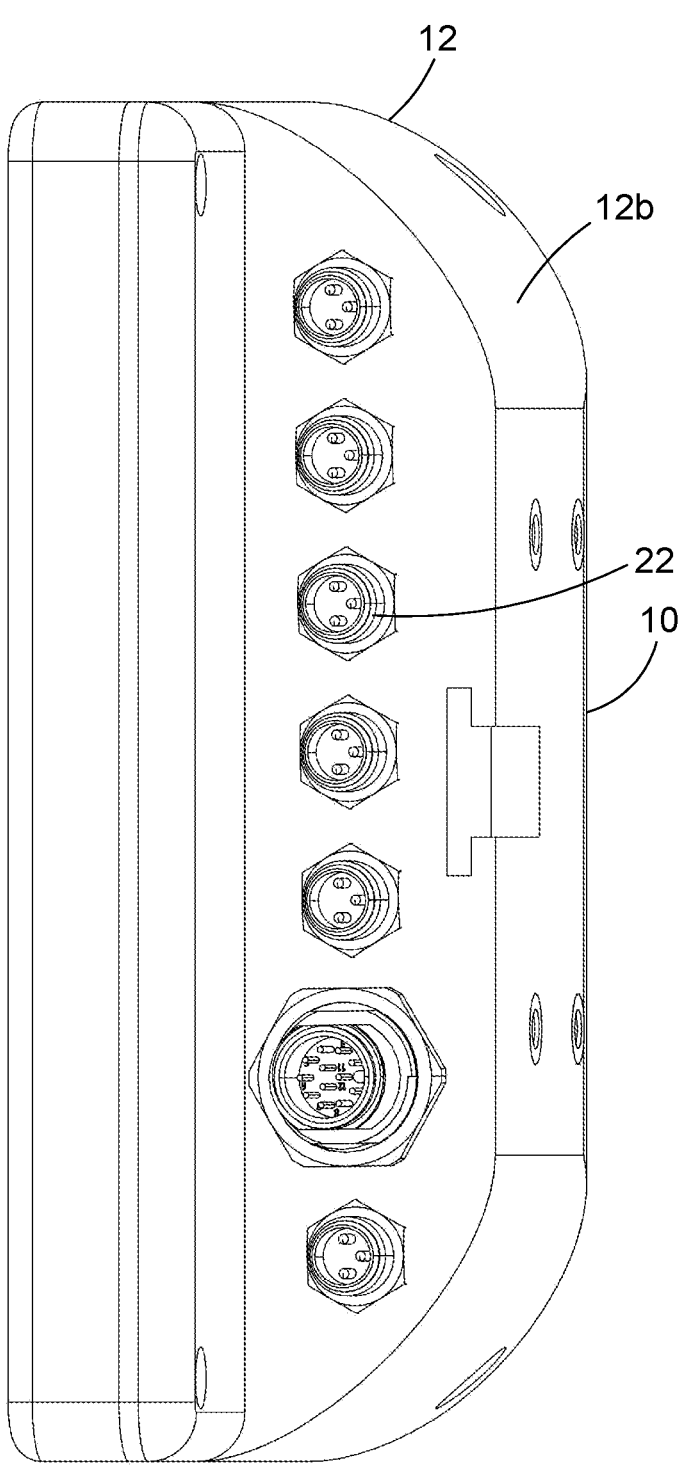
FIG. 3 shows a third view of the remote monitoring module of the present invention.

An exemplary remote monitoring module (10) is shown in FIGS. 1 to 3. The illustrated remote monitoring module (10) comprises an enclosure (12) that is defined by a back box (12*a*) and fascia (12*b*). The back box (12*a*) comprises a void for receiving a communications module (14), control circuitry (16), non-volatile memory (18). The fascia (12*b*) mounts a display screen (20) for providing a graphical user interface (GUI). The display screen (20) may be a touch screen or a simple LCD or LED display screen with no touch input functionality. The fascia (12*b*) may further comprise one or more buttons, switches, sliders or other input controls to enable user input. The enclosure (12) further comprises one or more connectors (22) for wired connection between the remote monitoring module (10) and one or more external devices, power supplies, or other components.

The communications module (14) houses a mobile communications sim card to facilitate communication between the remote monitoring module (10) and external computing devices, i.e., mobile phones, tablets, laptops, desktop computers and smart watches. Furthermore, the communications module (14) houses a radio frequency (RF) antenna and receiver to permit RF communication with an external RF device, i.e., an activation button (26) according to embodiments of the invention.

Control circuitry (16) may be based on any suitable processing circuitry such as processing circuitry based on one or more microprocessors, microcontrollers, digital signal processors, programmable logic devices, etc. In some embodiments, control circuitry executes instructions for data collection and transfer processes stored in memory (18). In some embodiments, control circuitry may include an integrated communications module (14) suitable for allowing communication between the remote communications module (10), removable activation button (26), and one or more external devices. The control circuitry (16) is operable to receive input from the display screen (18) and or other input controls to process user instructions, as will be described in more detail below. The control circuitry also receives inputs from the one or more connectors (22) and processes such input into data that is stored in the memory (18) and displayed on the display screen (20), as is described further below. Memory (18) (e.g., random-access memory, read-only memory, or any other suitable memory), hard drives, optical drives, or any other suitable fixed or removable storage devices may be provided as storage that is part of the control circuitry (16). Storage may include one or more of the above types of storage devices. For example, the remote communications module (10) may include a hard drive and a secondary storage device. Storage may be used to store various types of data described herein, user preferences or profile information, or other data used in operating the remote monitoring module (10). The memory (18) may also be used to launch a boot-up routine and execute other instructions.

A remote monitoring module (10) configured for use in connection with monitoring of one or parameters of a vehicle, i.e., a working machine, may comprise the following connectors: power input (22a), fire sensor input (22b), service sensor input (22c), pressure sensor input (22d), activation signal output (22e), engine monitor signal input (22f), battery signal strength input (22g), beacon/sounder output (22h), loudspeaker output (22i), smoke detector input (22j), temperature sensor (22k) and activation button input (221). The foregoing are examples of possible connectors (22) and it will be appreciated that other types of connector may be used in embodiments of the invention.

The enclosure (12) further comprises a mount (24) for attaching the remote monitoring module (10) to a surface. The mount (24) may comprise suction means for attaching the remote monitoring module (10) to a flat surface such as a window, dashboard or cabinet. The mount (24) may also be formed from two complimentary parts, i.e., a first part (24a) that is permanently fixed to a vehicle or cabinet, for example, that incorporates a first mounting feature, and a second part (24b) that incorporates a second mounting feature. The first and second mounting feature may define a snap fit, push fit or screw fit interface to facilitate selective attachment and removal of the second part (24b) of the mount (20) from the first part (24a) of the mount (20). The position of the second part (24b) of the mount (24) relative to the first part (24a) of the mount (24) may be angularly adjusted by way of a ball and socket joint or hinged joint (24c), for example. The second part (24b) of the mount (24)

The removable activation button (26) may be selectively attached to the enclosure (12) of the remote monitoring module (10). For example, the removable activation button (26) may be magnetically attachable to the enclosure (10). It will however be appreciated that the removable activation button (26) may be attached to the enclosure (12) in any way that allows easy and quick removal of the activation button (22) from the enclosure (10). The removable activation button (22) may be wirelessly connected to the communications module (14) by way of Bluetooth, WiFi, GSM, 3G, 4G, 5G or radio frequency, for example. The activation button (26) although referred to as a "button" may also comprise a slider, a toggle switch, a control knob, a touch screen representation of a button, or any other actuable control that is suitable to transmit a signal to the control circuitry (16) to activate a fire suppression system.

Figure 4:
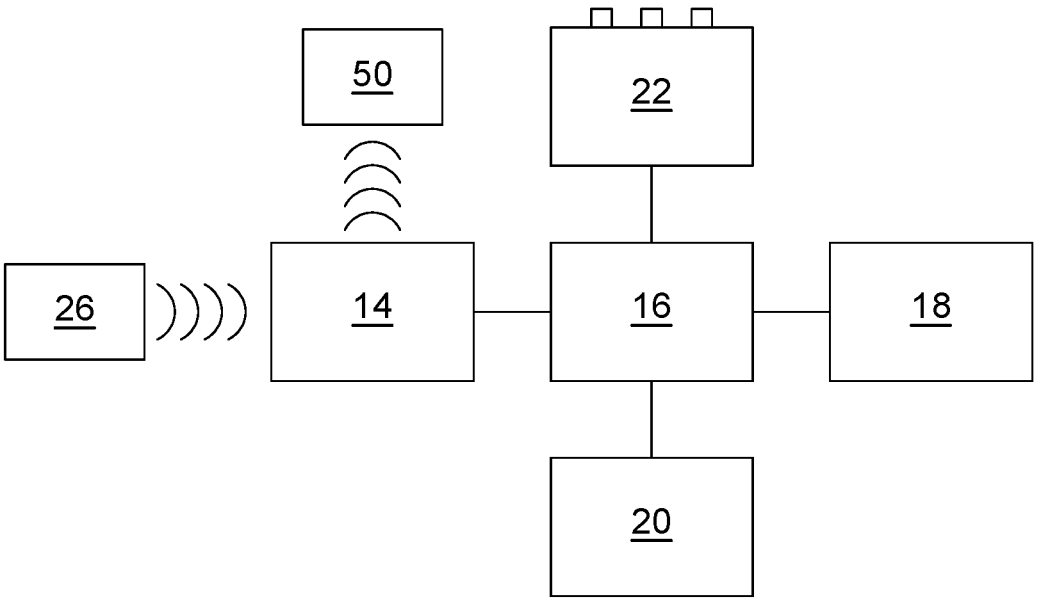
FIG. 4 shows a circuit diagram of the remote monitoring module of the present invention.

As shown in FIG. 4, the control circuitry (16) connects each of the communications module (14), memory (18), display screen (20) and connectors (22). The communications module (14) is wirelessly connected to the activation button (26). The communications module (14) also wirelessly connects the remote monitoring device (10) to a remote device (50) by way of WiFi, GSM, Bluetooth, 3G, 4G or 5G, for example.

Figure 5:
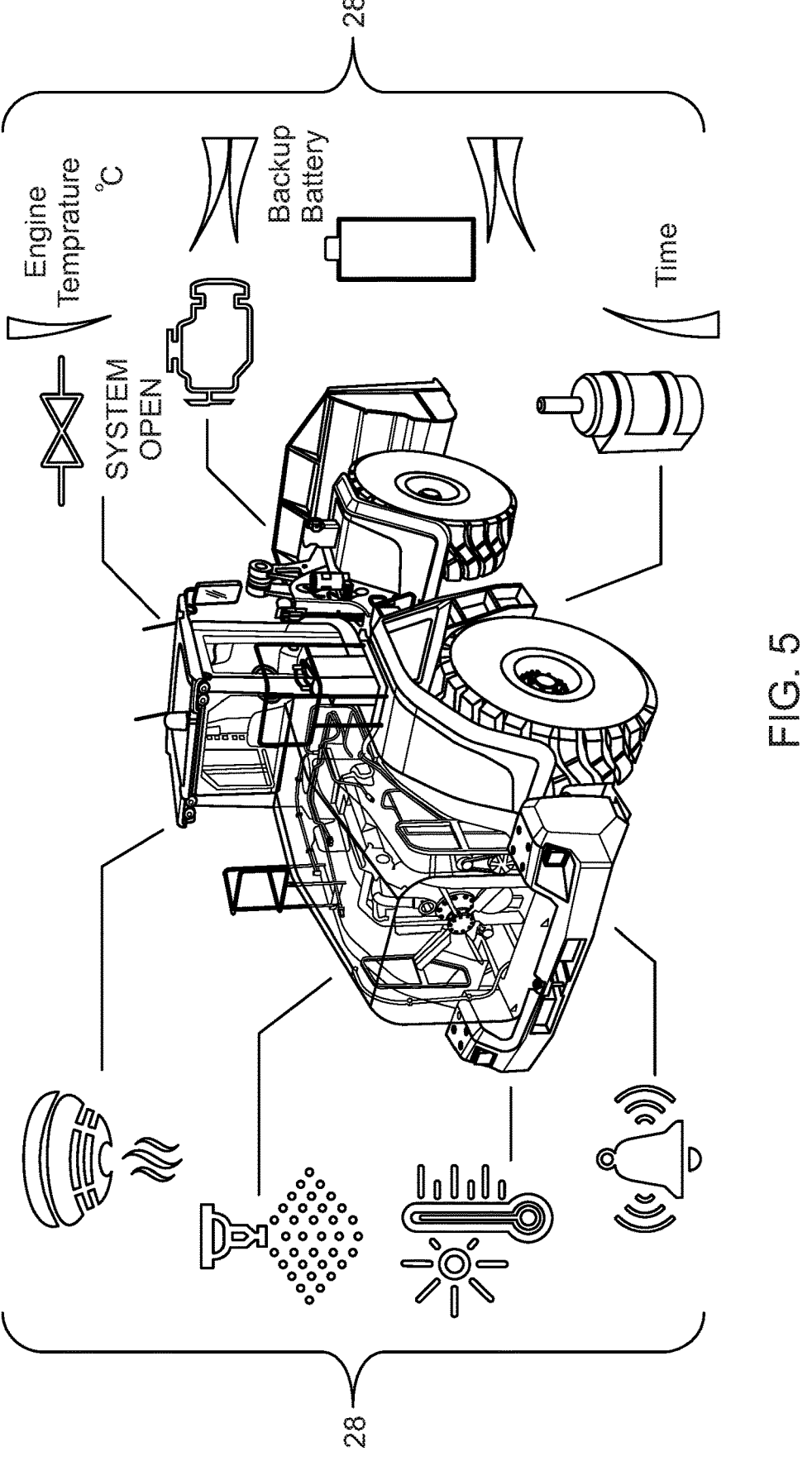
FIG. 5 shows an exemplary output of a display screen of the remote monitoring module of the present invention.

As shown in FIG. 5, the display screen (20) may generate for display an image of a vehicle, plant or machinery, for example. The image generated for display may be generic or specific for the type of vehicle, plant or machinery with which the remote monitoring module is associated. The image generated for display may be selected from one or more image files stored in the memory (18) or it may be downloaded from an external content source or uploaded to the remote monitoring device from an external device. In each case, an operator may interact with the display screen (20), in the case of a touch screen, or with one or more buttons, or other controls, of the remote monitoring device (10) to select an image for display or accept an image that is uploaded to the remote monitoring module (10) from an external device. It will be appreciated that while aspects and embodiments of the invention are described with reference to vehicles, plant and machinery, the remote monitoring module (10) may equally be installed in association with applications including: server cabinets, wind turbines, electrical cabinets and generators. This list is given by way of example only and is not exhaustive.

In addition to generation of display of an image of a vehicle, plant or machinery, the display screen (20) may also generate for display one or more representations (28) associated respectively with one or more of the power input (22a), fire sensor input (22b), service sensor input (22c), pressure sensor input (22d), activation signal input/output (22e), engine monitor signal input (22f), battery signal strength input (22g), in-cabin smoke/cigarette detector input (22h), GPS position input (22i), wireless notification input (22j) ball valve position (22k). Such representations may be manually selected by the user or fixed to generate for display with a particular image of a vehicle, plant or machinery. In some embodiments, a default configuration file is associated with each image of a vehicle, plant or machinery. The default configuration may or may not be re-configured by the operator. The display screen (20) may also generate for display a time, date, user profile information, for example.

In use, each representation (28) may have one or modes indicating a particular status of one or more of the power input (22a), fire sensor input (22b), service sensor input (22c), pressure sensor input (22d), activation signal input/output (22e), engine monitor signal input (22f), battery signal strength input (22g), in-cabin smoke/cigarette detector input (22h), GPS position input (22i), wireless notification input (22j) ball valve position (22k). In one embodiment, the indication may be green to indicate normal operating parameters, amber to indicate that maintenance may be needed and red to indicate an emergency or that urgent attention is required. In another embodiment, certain representations, i.e., those associated with the temperature sensor (22k) and battery signal strength input (22j), may include a numerical representation of the sensor value. This numerical input may also be presented in green, amber or red in the manner described above.

Figure 7:
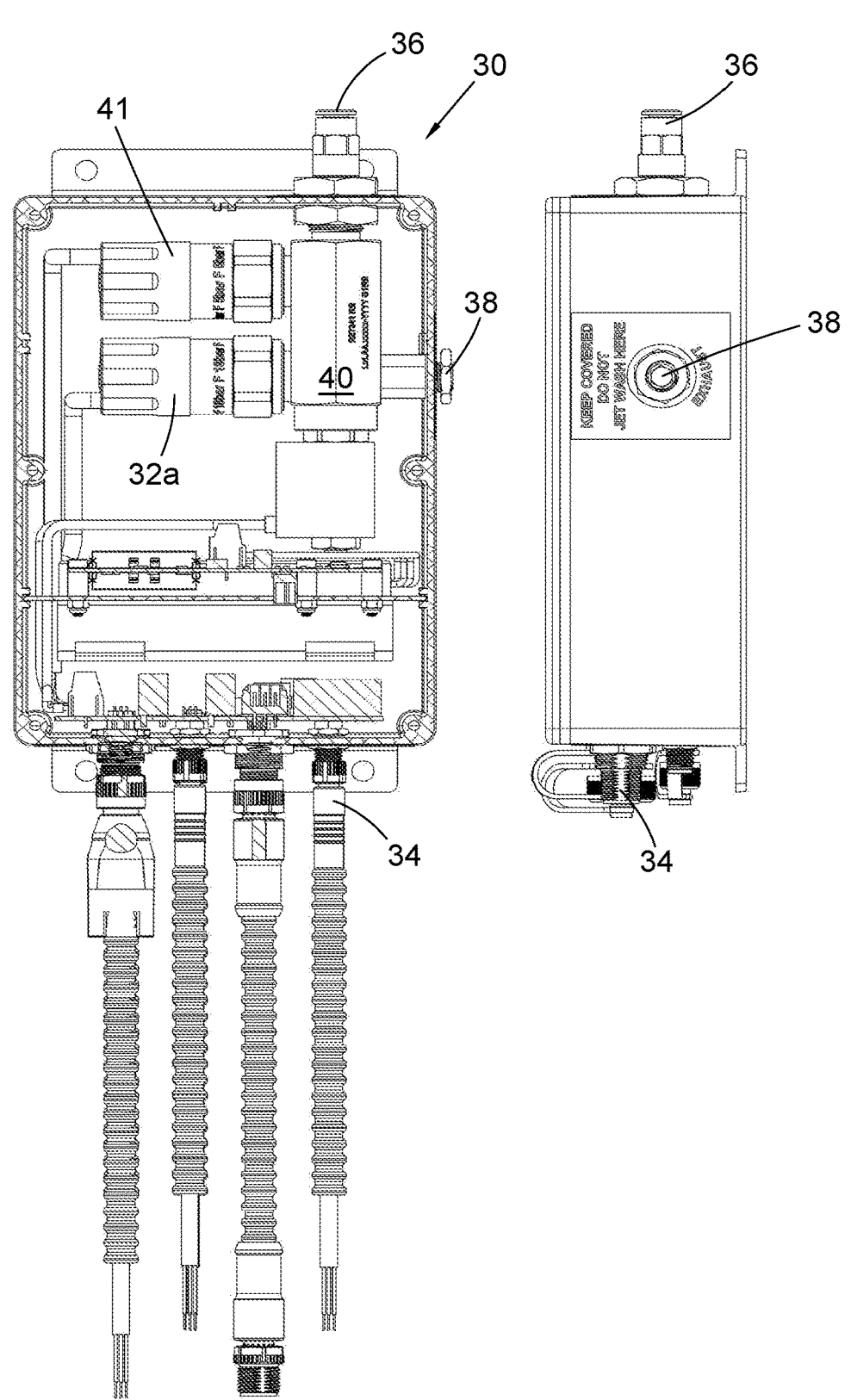
FIG. 7 shows a junction box according to an aspect of the invention.

Each sensor may be operatively connected to the remote module by way of respective communication paths between the respective sensor and a connection (22) of the remote monitoring module (10). A junction box (30) is positioned between each of the sensors (22) and the remote monitoring module (10). The junction box (30) is illustrated at FIG. 7 and comprises a plurality of inputs (32) and a plurality of outputs (34). For example, the junction box (30) may comprise a pressure switch (32a) that is configured to receive an input from at least one pressure sensor associated with a pressure of fire suppression apparatus. Upon discharge of the fire suppression apparatus, an input signal is provided, and the pressure (32a) is activated to operate an engine shut down process by way of an engine shutdown signal transmitted by way of an engine shutdown output. The engine shutdown signal may be sent immediately upon activation of the pressure switch or the engine shutdown signal may be delayed by a predetermined period of time after activation of the pressure switch (32a) before the engine shutdown signal is transmitted.

The junction box (30) further comprises a detection tube port (36) for receiving a termination of a fire suppression system detection tube and an exhaust port (38). Upon activation of the fire suppression system by way of rupture of the burst tube on the detection side of the fire suppression apparatus, the fire suppression medium is applied directly to the fire at the site of rupture of the burst tube. In the event of activation of the fire suppression system by way of the activation button (26), the detection medium, i.e., nitrogen, held in the burst tube is first vented out of the exhaust port (38) to atmosphere before the fire suppression medium is applied to the source of the fire. A solenoid valve (40) maintains the pressure of the detection medium when closed. Upon activation of the activation button (26), an electrical signal is sent from the activation button via the control circuitry (16) to the solenoid valve (40). The solenoid valve (40) is then opened to allow the detection medium to pass through the solenoid valve (40) and vent to atmosphere. As the detection medium vents, the pressure of the detection medium drops and when the pressure of the detection medium drops below a threshold, a pressure switch (41) is operable to send an electrical signal to activate the fire suppression apparatus.

Upon determination by the control circuitry (16) that a sensor input exceeds a threshold, or is outside of normal operating parameters, an activation signal, or other signal, may be transmitted by the communications module (14) to cause a fire suppression system, for example, to activate and remedy the cause of the abnormal sensor input. Transmission of the activation signal may occur automatically upon determination of a sensor input or the abnormal sensor input may be required to exist for at least a threshold period of time before the activation signal is transmitted. In some embodiments, the activation signal may not be transmitted automatically. In such embodiments, upon determination by the control circuitry (16) that a sensor input exceeds a threshold, or is outside of normal operating parameters, an audible, visual or tactile alert may be emitted by the remote monitoring module to alert an operator of an abnormal sensor input. The audible, visual or tactile alert may be emitted directly by the remote monitoring module (10) or by way of an external device such as a warning light, sounder or vibration actuator. The operator may then cause the activation signal to be transmitted manually by interacting with the display screen (20) or other input control of the remote monitoring module (10), or by way of interaction with the activation button (26).

Each of the representations (28) is now referred to in turn. A power input representation is defined by a LED on or through the enclosure (22). The LED is illuminated whenever primary or auxiliary power is supplied to the remote monitoring module (10).

A fire sensor input representation may be displayed on the display screen (20) in the form of a warning icon, i.e., a fire bell image. In the event of detection of a fire by the sensor input (22b), the display screen (20) generates the warning icon for display in a pre-determined location of the display screen (20). The warning icon may flash in a repetitive fashion to draw an operator's attention to the warning icon. Generation for display of the warning icon may be accompanied by an audible alarm in the form of a siren or voice message, for example.

A service sensor input representation may be displayed on the display screen (20) in the form of a service indication, i.e., pre-determined wording or an exclamation mark in a triangle. The control circuitry (16) may comprise a timer function that monitors service intervals. A service interval is stored in the memory (18). The controller (16) determines a start time or start counter of another parameter and an end time or end counter of the other parameter. Upon occurrence of the end time or end count, the service indication is generated for display. Furthermore, in the event the control circuitry (16) identifies a fault with any sensor (22) or the remote monitoring module (10) itself, the service indication is generated for display. In each instance, the service indicator may only be cleared either by completing a service action, or remedying the identified fault, as appropriate.

A pressure sensor input representation may be displayed on the display screen (20) in the form of a pressure indication, i.e., a pressure value. The control circuitry may receive sensor inputs from one or more pressure sensors associated with fire suppression apparatus. For example, fire suppression apparatus may comprise a pressurised valve that is held closed by pneumatically applied pressure. Upon reduction of pressure the valve is operable to activate the fire suppression apparatus. The pressure indication may thus signify the pressure applied to the valve either in absolute terms or by way of a colour coded indicator, for example. In other embodiments, the pressure sensor input representation may represent a measured pressure of vehicle tyres or engine component pressure, for example. The pressure sensor input representation may also indicate discharge of fire suppression apparatus and activation of the valve.

A wireless signal output representation may be displayed on the display screen (20) in the form of an indication representing wireless connection of the enclosure (22) to the activation button (26). The indication may be generated for display in different colours depending on the signal strength.

An engine monitor signal input representation may be displayed on the display screen (20) in the form of an engine indicator. The engine indicator may be represented in green during normal operation of the vehicle, plant or machinery, or not displayed at all. The engine indicator may be represented in red with a line through it and generated for display only in the event of engine shutdown, or determination by the control circuitry (16) of an engine fault.

A battery signal strength representation may be displayed on the display screen (20) in the form of a battery at various stages of charge. The battery signal strength representation may represent the state of charge of the activation button (26), remote monitoring module (10) itself, or any battery associated with the vehicle, plant or machinery.

An in-cabin smoke/cigarette detector representation may be displayed on the display screen (20) in the form of an appropriate graphic. The graphic is ordinarily not generated for display. Upon determination by the control circuitry (16)

that smoke, either in the event of a fire or due to cigarette smoke, is detected by the smoke detector, the graphic is generated for display on the display screen (20).

A GPS position representation may be generated for display on the display screen (20). Furthermore, the GPS position of the remote monitoring module, and thus the vehicle, plant or machinery within which the remote monitoring module (10) is installed, may be sent to a remote device so that the position of the vehicle, plant or machinery can be determined at any time or in the event of a specific event, i.e., a fire or a service interval falling due.

A wireless notification representation may be generated for display by the display screen (20). The communication module (14) may allow syncing of the remote monitoring module (10) with an operator's mobile device and the display screen (20) may be configured to generate for display a notification graphic upon the operator's device receiving a SMS, instant message, or other notification. Alternatively, the communication module (14) may comprise a sim card to enable SMS, instant message, or other notifications to be sent directly to the remote monitoring module (10).

A secondary valve position representation may be generated for display by the display screen (20). The secondary valve is an integral part of a primary valve forming part of a fire suppression apparatus. The secondary valve may be a ball valve or any other type of suitable valve. The secondary valve may be moveable at least between a first position and a second position. In one example, the first position is representative of the fire suppression apparatus being activated and the second position is representative of the fire suppression apparatus being deactivated. The secondary valve position representation is thus a graphic that may illustrate whether the fire suppression apparatus is deactivated or not.

The communications module (14) may be operable to facilitate transfer of data between the memory (18) and a remote server. For example, the remote server may send threshold parameters for each of the sensor inputs to the memory (18). The control circuitry may compare instantaneous or average sensor input values against the threshold parameters stored in the memory (18). The remote server may also send other data to the memory (18) including but not limited to configuration settings and security settings. The control circuitry (16) may also retrieve certain data from the memory (18) to send to the remote server by way of the communications module (14). Such data may include but is not limited to sensor data and usage data. Data transfer between the memory (18) and remote server may be initiated manually by an operator either at the remote server or at the remote monitoring module (10).

Alternatively, data transfer may be initiated automatically in response to a pre-determined trigger, i.e., at pre-determined intervals, upon vehicle start-up or upon vehicle shutdown.

Figure 6:
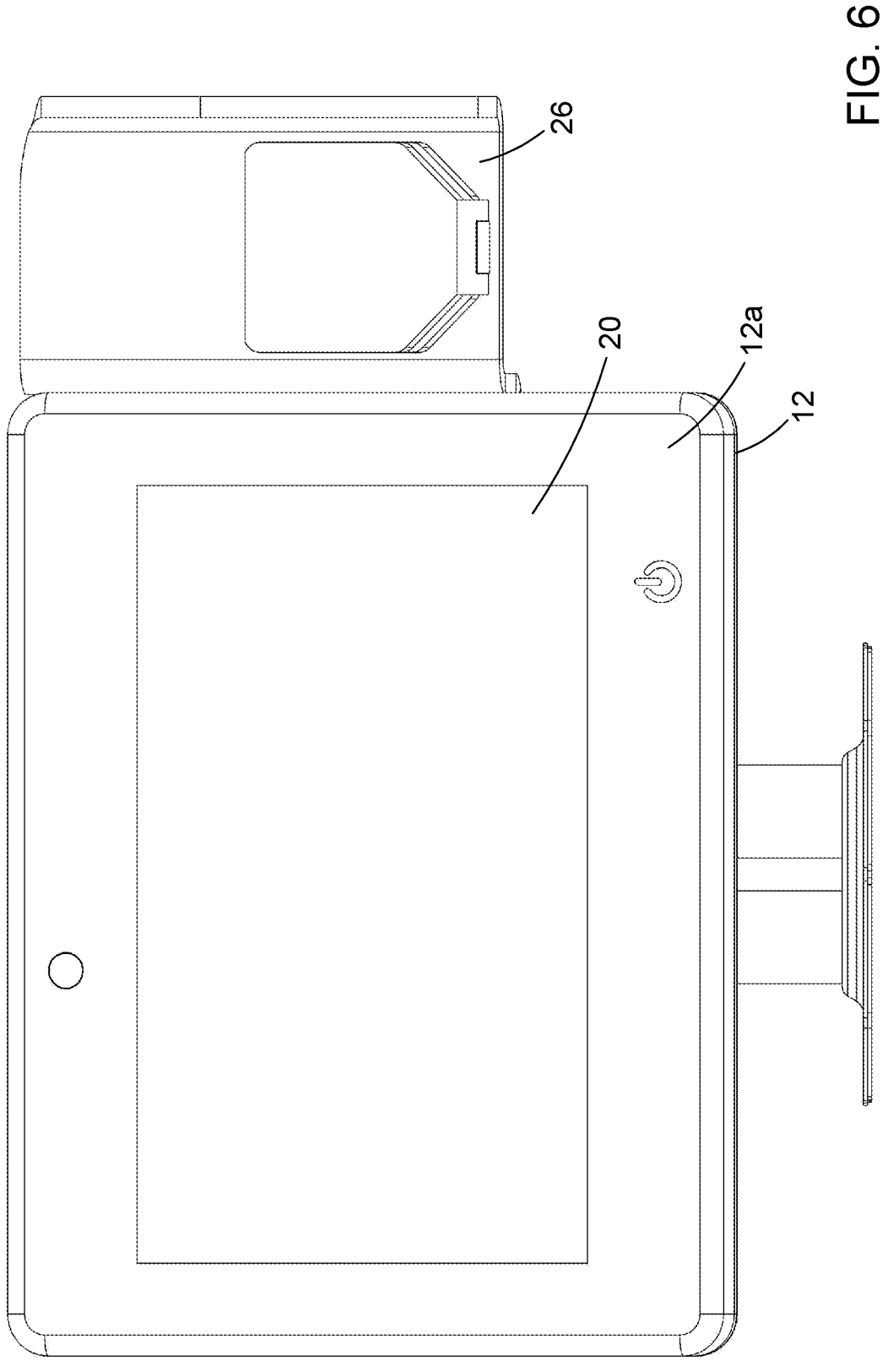
FIG. 6 shows an activation button of the present invention.

The activation button (26) of embodiments of the invention is shown in FIG. 6. The activation button (26) may further comprise a vibration actuator which is activated to provide tactile feedback to the operator upon determination by the control circuitry (16) that a sensor input exceeds a threshold or is outside of normal operating parameters. The vibration actuator may be configured to provide a differing vibration feedback depending on which sensor exhibits a sensor input exceeding a threshold or the amount by which the sensor exceeds the threshold. Furthermore, the activation button (26) may further comprise a LED or speaker configured to emit a warning light or sound respectively. As with the vibration actuator, the characteristic of the warning light or emitted sound may be configured to provide a differing light or sound feedback depending on which sensor exhibits a sensor input exceeding a threshold or the amount by which the sensor exceeds the threshold. The activation button may emit a warning signal, i.e., tactile, visual or auditory, in the event that it is moved out of range of the remote monitoring module (10). The warning signal may be emitted as the activation button approaches the limit of its range from the remote monitoring module (10). The activation button (26) may comprise an anti-tamper seal that requires piercing or deforming to allow access to the button by the operator. The anti-tamper seal may be a sheet of frangible material. In other embodiments, an anti-tamper mechanism may be provided instead of a seal. For example, a hinged cover may protect the button from inadvertent actuation. The hinged cover may be maintained in a locked position by a frangible insert. Application of force to the hinged cover to open it may break the frangible insert. In some embodiments, once the activation button (26) has been actuated, the remote monitoring module (10) may enter a "safe" mode and prevent further operation of the vehicle, plant or machinery until such time that the activation button (26) has been reset. Resetting the activation button (26) may involve replacing the anti-tamper seal or anti-tamper mechanism. Furthermore, an admin password may be entered into the remote monitoring module (10) by way of the display screen (20) or remotely from a remote device or server. Upon entering a correct admin password, the remote monitoring module (10) may exit safe mode and the vehicle, plant or machinery may again be operated.

In some embodiments, the control circuitry may prevent starting of a vehicle, plant or machinery if the activation button (26) is not attached to the enclosure (20) of the remote monitoring module (10), or otherwise positioned within close proximity of the vehicle, plant or machinery. This may be determined by the control circuitry determining that the activation button (26) is only a short distance away from the remote monitoring module (10). Alternatively, a safety switch must be de-activated by attaching the activation button (26) to the remote monitoring module (10) or inserting the activation button (26) into a specific cradle accommodating the safety switch, i.e., a microswitch.

The activation button (26) may be embedded in a software application residing on a mobile device such as a smart phone, tablet, laptop or smart watch. Upon determination by the control circuitry (16) that a sensor input exceeds a threshold, or is outside of normal operating parameter, the mobile device may launch a software application or perform one or more of the actions described above. The software application may then generate for display on a screen of the mobile device a representation of a button that an operator can interact with to cause the communications module (14) to transmit the activation signal. In such an implementation of the invention, the operator may be required to enter a password, or pin number, to be able to interact with the representation of a button.

The remote monitoring module (10), in some embodiments, comprises a microphone (30) for receiving voice commands from an operator. The memory (18) may store one or more command words which, when uttered by the user and captured by the microphone (30) cause the control circuitry (16) to transmit the activation signal. Further examples of actions that may be performed in response to voice input command signals include cancelling an alarm, turning the remote monitoring module (10) on/off, opening notifications received by the remote monitoring module (10)

and providing a status of one or more input sensors, for example. Standard natural language processing techniques may be used to convert speech input from an operator into machine readable instructions. Such techniques are outside of the scope of the present invention.

The activation button (26) may also comprise a microphone for relaying voice commands from the activation button (26) to the control circuitry (16) via the communications module. The above description in relation to inputs provided by the user through the microphone (30) apply equally to use of a microphone forming part of the activation button.

Figure 8:
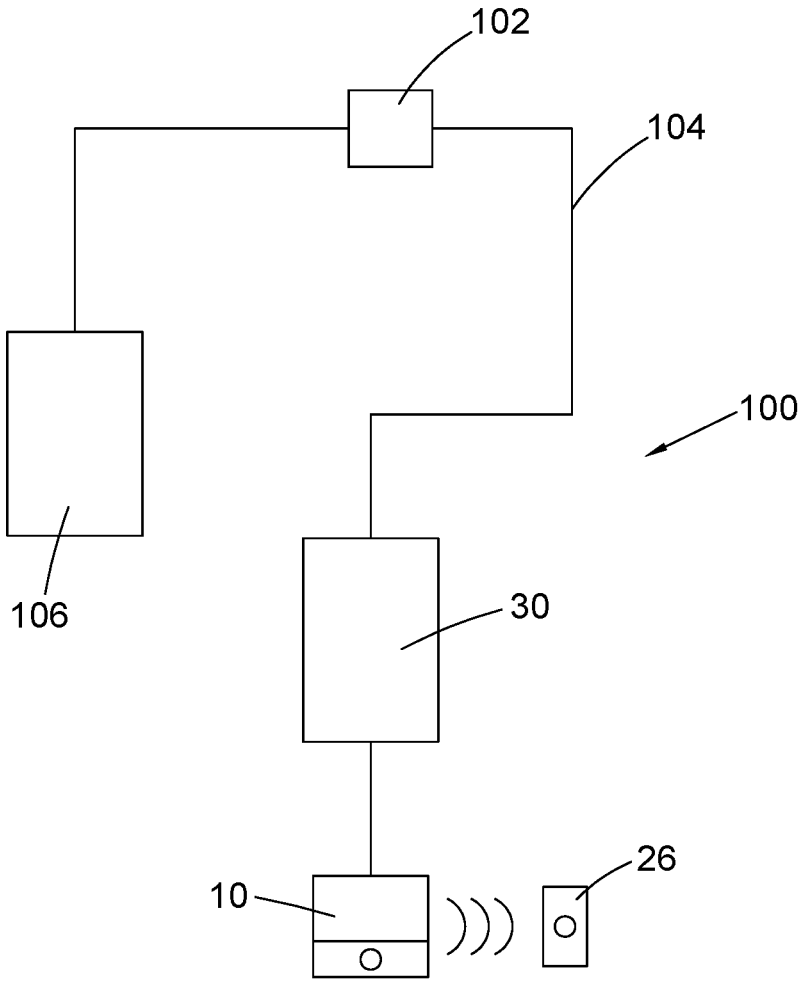
FIG. 8 shows a system diagram of a system according to an aspect of the invention.

A circuit diagram of a fire suppression system (100) is shown in FIG. 8. The system comprises an automatic valve (102) that is normally held closed under pressure from an inert gas that is flowed through at least one burst tube (104). The burst tube (104) follows a path above or adjacent to assets to be protected by the system (100). In the event of a fire, the burst tube (104) ruptures and the inert gas flowing therethrough is expelled from the burst tube (104) at the point of rupture. The automatic valve (102) then opens to permit a fire suppression medium to pass through the automatic valve (102) and to be applied to the source of the fire through one or more outlets. An automatic valve (102) is more particularly described in GB2568276, the contents of which are hereby incorporated by reference. One end of the burst tube (104) terminates at an inert gas source (106) which feeds the burst tube (104) and the other end of the burst tube (104) terminates at the junction box (30). Operation of the junction box is described above. The remote monitoring module (10) is operatively connected to the junction box (30), also as described above, and the activation button (26) may be selectively attached to and removed from the remote monitoring module (10) and is also wirelessly connected thereto (26).

While embodiments of the invention are described by way of reference to transmission of an activation signal for a fire suppression system, it will be appreciated that other signals may be transmitted from the remote monitoring device (10) to cause components of the vehicle, plant or machinery to take a pre-determined action. For example, transmission of a signal from the remote monitoring module (10) may cause shut down of a vehicle, plant or machinery, variation of an input or output parameter or activation of maintenance protocols.

The above embodiments are exemplary only, and other possibilities and alternatives within the scope of the appended claims will be apparent to those skilled in the art.

The invention claimed is:

1. A remote monitoring module comprising:
an enclosure for housing control circuitry configured to activate one or more safety protocols at a location;
a communications module that is connected to the control circuitry, and configured to enable wireless communication between the remote monitoring module and an external device that is removable from the location,
wherein the external device comprises an activation button, wherein the activation button is physically attachable and detachable from the enclosure, the enclosure defining a first attachment part, and the activation button defining a second attachment part configured to cooperate with the first attachment part, together the first attachment part and second attachment part cooperate to enable selective attachment of the activation button to the enclosure; and
wherein actuation of the activation button when the external device is not at the location causes: a transmission of a wireless activation signal that the control circuitry executes to activate at least one of the one or more safety protocols at the location.

2. The remote monitoring module according to claim 1, wherein the enclosure comprises a backbox for housing the control circuitry and a fascia that mounts a display screen.

3. The remote monitoring module according to claim 2 further comprising at least one input connection and at least one output connection.

4. The remote monitoring module according to claim 2, wherein the display screen is configured to display an image of a vehicle or structure within which the remote monitoring module is mounted.

5. The remote monitoring module according to claim 2, wherein the display screen is a touch screen.

6. The remote monitoring module according to claim 1, wherein the control circuitry further comprises a first wireless connection with the activation button and a second wireless connection with a remote device.

7. The remote monitoring module according to claim 1, wherein the first attachment part comprises a first electrical connector and the second attachment part comprises a second electrical connector, the first and second electrical connectors cooperating to provide power from the control circuitry to the activation button when the activation button is attached to the enclosure.

8. The remote monitoring module according to claim 3, wherein the at least one input connection comprises one or more of the inputs: fire sensor, service sensor, pressure sensor, smoke detector, temperature sensor, engine monitor sensors or battery sensors.

9. The remote monitoring module according to claim 8, wherein the screen is configured to display a graphic or indicator corresponding to each of the at least one input connection.

10. The remote monitoring module according to claim 6, wherein the control circuitry comprises a RF antenna and the activation button comprises a RF receiver.

11. The remote monitoring module according to claim 6, wherein the activation button further comprises vibration means operable in response to receiving a signal via the first wireless connection indicative of a sensor input exceeding a predetermined threshold.

12. The remote monitoring module according to claim 11, further comprising at least one of a visual warning indicator or a speaker.

13. The remote monitoring module according to claim 12, wherein the vibration means, the visual warning indicator, and the speaker is operable to deliver a different characteristic of warning indication depending on the at least one of: (i) a type of sensor that is determined to have exceeded the predetermined threshold, or (ii) an amount by which the pre-determined threshold of the sensor input has been exceeded.

14. The remote monitoring module according to claim 9, wherein the graphic or indicator corresponding to each of the one or more inputs, is selectable by a user to generate for display a menu representative of the one or more inputs associated with the graphic or indicator.

15. A system for monitoring for occurrence of an emergency event, the system comprising:
a remote monitoring module according to claim 1;
at least one of a fire sensor, service sensor, pressure sensor, smoke detector, temperature sensor, engine monitor sensor or battery sensor operably connected to respective input connections of the remote monitoring module; and

13

14 fire suppression apparatus that is operable by way of one or more of the fire sensor, service sensor, pressure sensor, smoke detector, temperature sensor, engine monitor sensor or battery sensor outputting a value that is determined by the control circuitry to be representative of a value that exceeds a predetermined threshold, or by way of actuation of the activation button.

16. The system according to claim 15 further comprising a junction box, the junction box comprising an enclosure having at least one input port for a fire detection system, an input for receiving a request to activate a fire suppression system and an exhaust, wherein an inert gas is delivered to the junction box via the input port for the fire detection system and a flow path between the input port for the fire detection system and the exhaust is provided, wherein the flow path is interrupted by a valve that is normally closed, and wherein upon receipt of a request to activate the fire suppression system, the valve is opened to permit the inert gas to pass through the valve and exit the enclosure by way of the exhaust.

\* \* \* \* \*